(12) United States Patent
Ahn

(10) Patent No.: US 10,707,512 B2
(45) Date of Patent: Jul. 7, 2020

(54) MONOPROPELLANT SYSTEM FOR REGENERATIVE FUEL CELL AND METHOD FOR MONO-PROPULSION USING SAME

(71) Applicant: KOREA AEROSPACE RESEARCH INSTITUTE, Daejeon (KR)

(72) Inventor: Hyojung Ahn, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 40 days.

(21) Appl. No.: 15/777,824

(22) PCT Filed: Nov. 18, 2016

(86) PCT No.: PCT/KR2016/013367
§ 371 (c)(1),
(2) Date: May 21, 2018

(87) PCT Pub. No.: WO2017/086749
PCT Pub. Date: May 26, 2017

(65) Prior Publication Data
US 2018/0337418 A1   Nov. 22, 2018

(30) Foreign Application Priority Data
Nov. 19, 2015  (KR) .................. 10-2015-0162524

(51) Int. Cl.
*H01M 8/0656*   (2016.01)
*B60L 50/72*    (2019.01)
(Continued)

(52) U.S. Cl.
CPC ............. *H01M 8/186* (2013.01); *B60L 8/003* (2013.01); *B60L 15/007* (2013.01); *B60L 50/72* (2019.02);
(Continued)

(58) Field of Classification Search
None
See application file for complete search history.

(56) References Cited

U.S. PATENT DOCUMENTS 6,766,638 B1 *  7/2004  Tilston .............. F02K 9/68
                                                60/218
8,282,045 B2   10/2012  Nann et al.
2010/0213319 A1 *  8/2010  Nann .............. B64G 1/402
                                                244/171.1

FOREIGN PATENT DOCUMENTS

JP   2003-505641 A   2/2003
JP   2005-53353 A    3/2005
(Continued)

OTHER PUBLICATIONS

International Search Report of PCT/KR2016/013367 which is the parent application and its English translation—4 pages, (dated Jan. 13, 2017).

*Primary Examiner* — Yoshitoshi Takeuchi
(74) *Attorney, Agent, or Firm* — Knobbe Martens Olson & Bear LLP

(57) ABSTRACT

The present invention relates to a monopropellant system for a regenerative fuel cell (RFC) and a method for mono-propulsion using same and, more specifically, to a monopropellant system for an RFC which can, when operating an electrically propelled airplane adopting an RFC system, secure more energy via a monopropellant than conventional methods and use same as a propulsion source for airplane takeoff and so on, and to a method for mono-propulsion using the monopropellant system for an RFC.

4 Claims, 3 Drawing Sheets

(51) Int. Cl.
*H01M 8/18* (2006.01)
*B64D 27/24* (2006.01)
*B64D 41/00* (2006.01)
*B60L 15/00* (2006.01)
*B60L 8/00* (2006.01)

(52) U.S. Cl.
CPC .............. *B64D 27/24* (2013.01); *B64D 41/00* (2013.01); *H01M 8/0656* (2013.01); *B60L 2200/10* (2013.01); *B64D 2041/005* (2013.01); *B64D 2211/00* (2013.01); *H01M 2250/20* (2013.01); *Y02E 60/528* (2013.01); *Y02T 50/62* (2013.01); *Y02T 90/36* (2013.01)

(56) References Cited

FOREIGN PATENT DOCUMENTS

| | | |
|---|---|---|
| JP | 2010-144203 A | 7/2010 |
| KR | 10-2004-0008414 A | 1/2004 |
| KR | 10-2012-0077462 A | 7/2012 |
| KR | 10-1644101 B1 | 7/2016 |

\* cited by examiner

MONOPROPELLANT SYSTEM FOR REGENERATIVE FUEL CELL AND METHOD FOR MONO-PROPULSION USING SAME

TECHNICAL FIELD

The present invention relates to a monopropellant system for a regenerative fuel cell (RFC) system and a mono-propulsion method using the same, and more particularly, a monopropellant system for a regenerative fuel cell and a mono-propulsion method using the same, for ensuring a larger amount of energy via a monopropellant for management of an electric propulsion aircraft employing an RFC system than an existing method and using the energy for take-off and other propulsion sources of an aircraft.

BACKGROUND ART

In general, an electric propulsion aircraft employing a regenerative fuel cell (RFC) system simultaneously uses a solar cell and a fuel cell. For example, for a long flight, a portion of energy obtained by a solar cell is used for flight energy during the daytime, residual energy is stored in a tank in the form of gas of hydrogen and oxygen formed via electrolysis of water and, then, power is acquired using hydrogen and oxygen that are stored in the fuel cell at nighttime when sunlight is not present to maintain propulsion force. That is, an electric propulsion aircraft employing an RFC system charges/discharges electricity via a fuel cell device and a water electrolysis device using a reactant, an oxide, a reduced substance, or the like as fuel.

The electric propulsion aircraft employing the RFC system uses the largest amount of energy during take-off. The electric propulsion aircraft employing the RFC system takes off at a time point when solar energy is highest and also stores hydrogen and oxygen gas in a hydrogen and oxygen tank at maximum pressure to ensure as much energy as possible during take-off. This is because it is possible to obtain maximum output when electrochemical reaction occurs between hydrogen and oxygen that are stored at maximum pressure. That is, power required for take-off may be sufficiently ensured via electrochemical reaction by storing hydrogen and oxygen gas at maximum pressure. In addition, the electric propulsion aircraft employing the RFC system needs to vacate a water tank for storing water generated via hydrogen and oxygen bond and, thus, there is a problem in that sufficient energy for take-off is not stored to degrade a freedom degree of design.

In this regard, Korean Patent Laid-Open Publication No. 10-2004-0008414 ("Operating system for unmanned aerial vehicle" published on Jan. 31, 2004, hereinafter referred to the cited reference) discloses an unmanned aerial vehicle using a solar cell and an internal combustion engine. However, the cited reference has a problem in that sufficient energy is not ensured during take-off.

DISCLOSURE

Technical Problem

An object of the present invention is to provide a monopropellant system for a regenerative fuel cell and a mono-propulsion method using the same, for ensuring a larger amount of energy via a monopropellant for management of an electric propulsion aircraft employing an RFC system than an existing method and using the energy for take-off and other propulsion sources of an aircraft.

Technical Solution

In one general aspect, a monopropellant system for a regenerative fuel cell includes a power supply portion 100 configured to generate or store electricity, a fuel cell portion 200 connected to a fuel supply portion 201 configured to supply hydrogen and oxygen and configured to generate electricity and a reactant using the hydrogen and the oxygen, a controller 300 configured to perform control to use any one of electricity generated from the power supply portion 100 or electricity generated from the fuel cell portion 200, a driver 400 configured to be driven using electricity of the power supply portion 100 or the fuel cell portion 200, a fuel storage portion 500 configured to accommodate fuel or to store the reactant generated from the fuel cell portion 200, and a propulsion portion 600 configured to generate propulsion force using the fuel or reactant of the fuel storage portion 500.

The propulsion portion 600 may further include a catalyst portion 700 configured to enable catalytic reaction of the fuel or reactant of the fuel storage portion 500.

The fuel storage portion 500 may further include a hydrogen peroxide tank 510 connected to the fuel storage portion 500 and configured to accommodate hydrogen peroxide therein.

The controller 300 may perform control to enable electrolysis of the reactant accommodated in the fuel storage portion 500 using electricity generated by or stored in the power supply portion 100 and to store hydrogen and oxygen generated through the electrolysis in the hydrogen tank 210 and the oxygen tank 220, respectively.

The fuel storage portion 500 may accommodate a hydrogen peroxide aqueous solution obtained by mixing water and hydrogen peroxide therein or accommodate a reactant generated by the fuel cell therein.

The reactant may include any one of selected from the group consisting of a hydrogen peroxide aqueous solution obtained by mixing water and hydrogen peroxide, water, or hydrogen peroxide.

The fuel supply portion 201 may include a hydrogen tank 210 configured to accommodate hydrogen and an oxygen tank 220 configured to accommodate oxygen.

In another general aspect, a mono-propulsion method using the monopropellant system for the regenerative fuel cell includes propelling S100 for generating propulsion force using a fuel or reactant accommodated in a fuel storage portion 500 when propulsion force is required during take-off or other cases, and driving S200 for driving a driver 400 using electricity generated by or stored in a power supply portion 100 or a fuel cell portion 200 when the fuel or the reactant is entirely consumed.

The propelling S100 may include enabling catalytic reaction of the fuel or reactant accommodated in the fuel storage portion 500 to generate propulsion force.

The propelling S100 may include mixing the reactant accommodated in the fuel storage portion 500 and hydrogen peroxide accommodated in a hydrogen peroxide tank 510 connected to the fuel storage portion 500.

The driving S200 may include fuel cell driving S210 for combining hydrogen and oxygen accommodated in a hydrogen tank 210 and an oxygen tank 220 to generate electricity and driving the driver 400 when electricity is generated by the fuel cell portion 200, and reactant storing S211 for storing a reactant generated via combination of hydrogen and oxygen in the fuel cell driving S210 in the fuel storage portion 500.

The driving S200 may include solar cell driving S220 for driving the driver 400 using electricity generated by or stored in the power supply portion 100 when the electricity generated by or stored in the power supply portion 100 is used, and electrolyzing S221 for electrolyzing a reactant generated by the fuel cell portion 200 using a portion of electricity generated by the power supply portion 100.

Advantageous Effects

According to the exemplary embodiment of the present invention, it is possible to provide a monopropellant system for a regenerative fuel cell (RFC) system and a mono-propulsion method using the same, for ensuring a larger amount of energy using a monopropellant than an existing method during take-off of an electric propulsion aircraft employing an RFC system to advantageously compensate for insufficient propulsion force to enable take-off.

Figure 1:
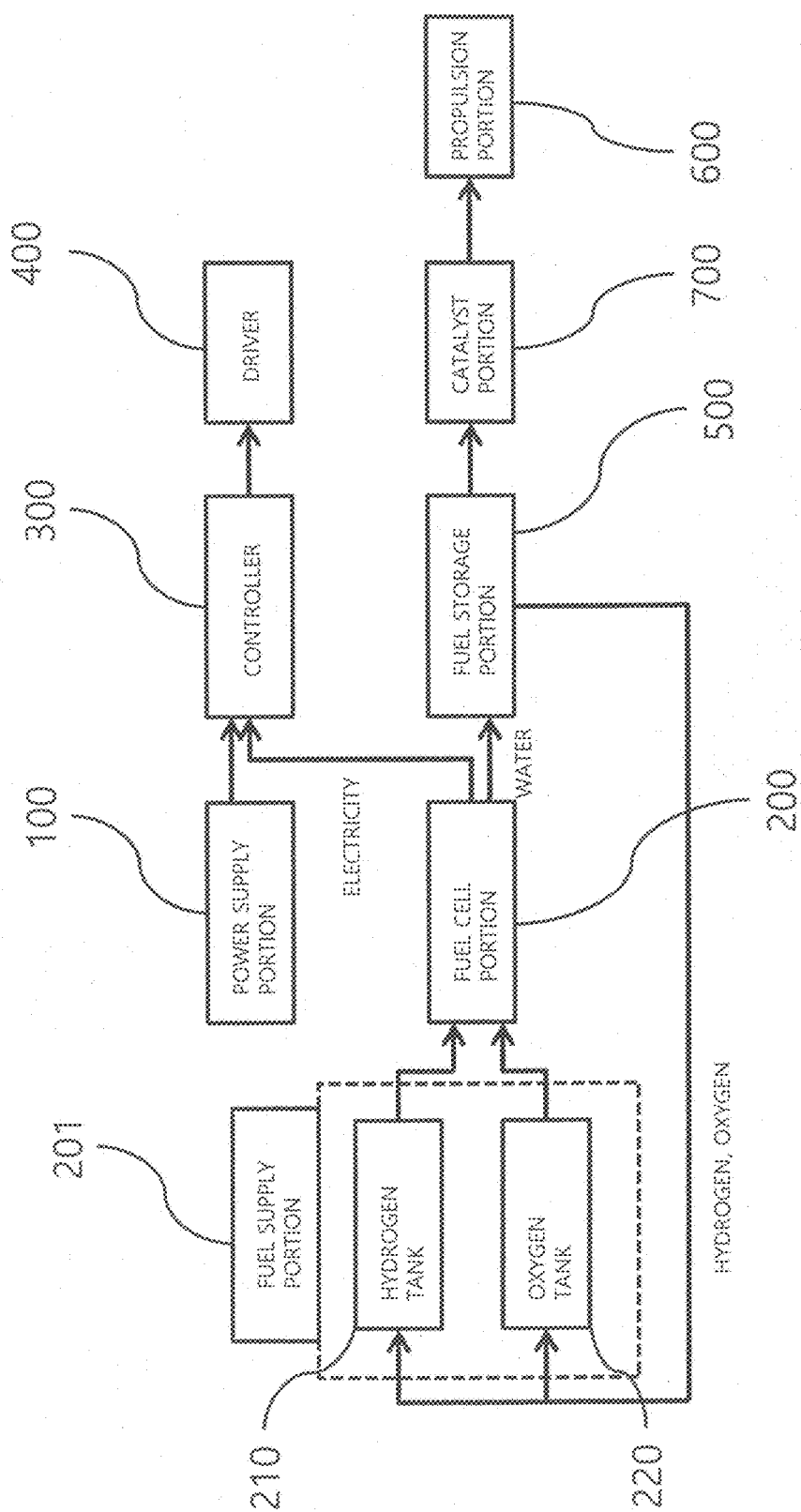
FIG. 1 is a diagram of a configuration of a monopropellant system for a regenerative fuel cell according to an exemplary embodiment of the present invention.

| -Explanation of Reference Numerals- | |
|---|---|
| 100: power supply portion | |
| 200: fuel cell portion | 201: fuel supply portion |
| 210: hydrogen tank | 220: oxygen tank |
| 300: controller | |
| 400: driver | |
| 500: fuel storage portion | 510: hydrogen peroxide tank |
| 600: propulsion portion | |
| 700: catalyst portion | |
| S100: propelling | |
| S200: driving | S210: fuel cell driving |
| S211: reactant storing | S220: solar cell driving |
| S221: electrolyzing | |

BEST MODE

The present invention will now be described more fully with reference to the accompanying drawings, in which exemplary embodiments of the invention are shown.

The accompanying drawings are merely an example illustrated for explanation of the features of the present invention in detail and, thus, the features of the present invention are not limited to the embodiments illustrated in the accompanying drawings.

Figure 2:
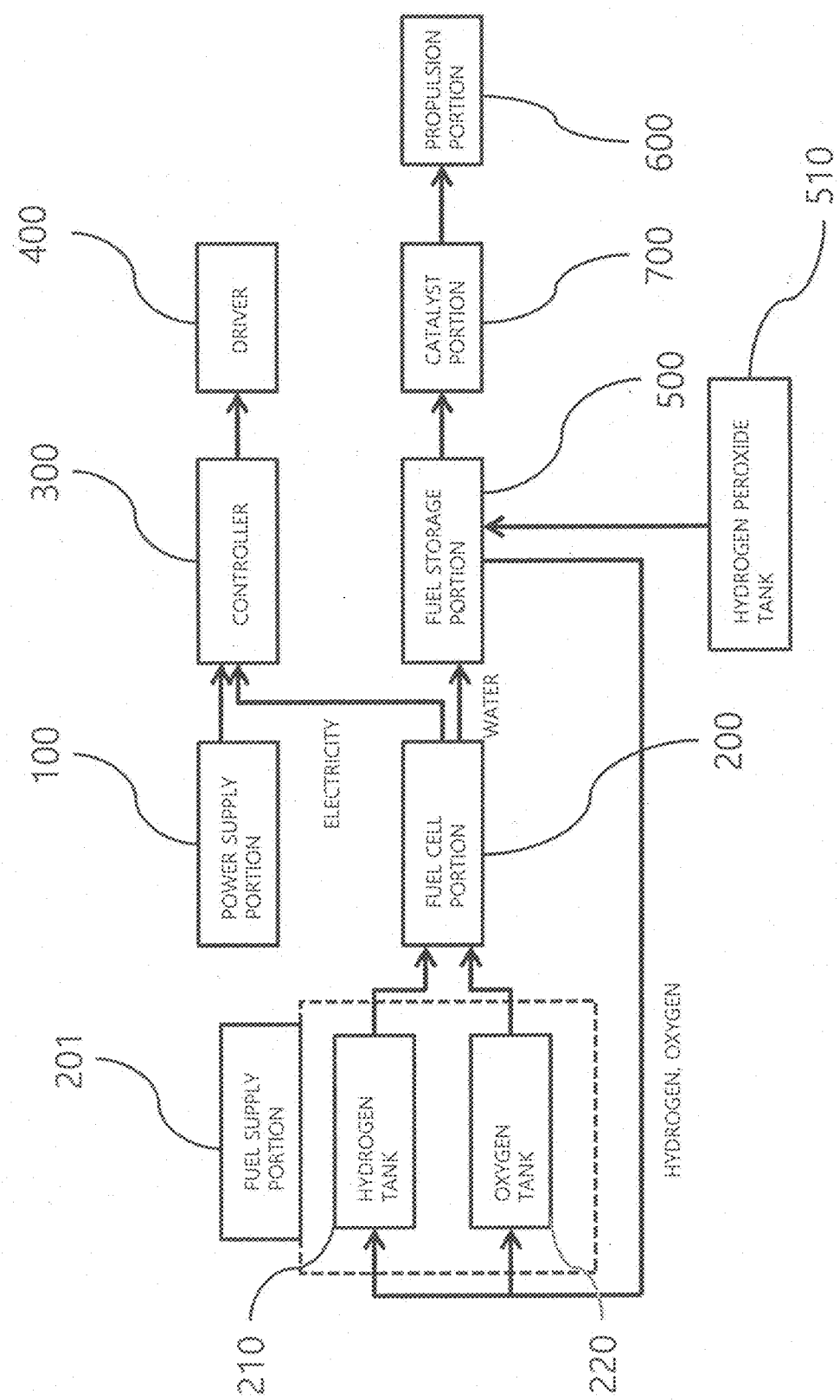
FIG. 2 is a diagram of a configuration of a monopropellant system for a regenerative fuel cell according to another exemplary embodiment of the present invention.

FIG. 1 is a diagram of a configuration of a monopropellant system for a regenerative fuel cell according to an exemplary embodiment of the present invention and FIG. 2 is a diagram of a configuration of a monopropellant system for a regenerative fuel cell according to another exemplary embodiment of the present invention.

As shown in FIGS. 1 and 2, a monopropellant system for a regenerative fuel cell according to the present invention may include a power supply portion 100, a fuel cell portion 200, a controller 300, a driver 400, a fuel storage portion 500, and a propulsion portion 600.

The power supply portion 100 may generate electricity or store electricity. For example, the power supply portion 100 may be a renewable energy source for generating electricity using solar energy, such as a solar cell, or a general energy storage device for storing electricity, such as a battery.

The fuel cell portion 200 may be a fuel cell for generating electricity and water using hydrogen and oxygen. In more detail, the fuel cell portion 200 may be connected to a fuel supply portion 201 for supplying hydrogen and oxygen. The fuel supply portion 201 may include, for example, a hydrogen tank 210 and an oxygen tank 220 and the fuel cell portion 200 may be connected to each of the hydrogen tank 210 and the oxygen tank 220. The hydrogen tank 210 may fully accommodate hydrogen and the oxygen tank 220 may fully accommodate oxygen. That is, hydrogen and oxygen accommodated in the hydrogen tank 210 and the oxygen tank 220 react with each other in the fuel cell portion 200 to generate electricity and a reactant. The generated electricity may be used to drive the driver 400 and the reactant may be moved and stored in the fuel storage portion 500. In this case, the reactant may be water or hydrogen peroxide. The reactant may be a hydrogen peroxide aqueous solution obtained by mixing water and hydrogen peroxide.

The controller 300 may control the power supply portion 100 or the fuel cell portion 200 to generate electricity depending on the cases.

For example, when the power supply portion 100 is a solar cell, the controller 300 may control the solar cell to generate electricity during the daytime when sunlight is present and, in this case, the generated electricity may drive the driver 400 or control the driver 400 to enable electrolysis of a reactant accommodated in the fuel storage portion 500. The controller 300 may perform control to store hydrogen and oxygen that are generated via electrolysis of the reactant in the hydrogen tank 210 and the oxygen tank 220, respectively.

The controller 300 may perform control to generate electricity using a fuel cell at nighttime. In more detail, the fuel cell portion 200 may allow hydrogen and oxygen accommodated in the hydrogen tank 210 and the oxygen tank 220 to react with each other to generate electricity and the electricity may drive the driver 400. In this case, water may be generated via reaction between hydrogen and oxygen and stored in the fuel storage portion 500.

When the power supply portion 100 is a battery, the controller 300 may perform control to enable electrolysis of the reactant accommodated in the fuel storage portion 500 using electricity stored in the battery. When propulsion force is required, the controller 300 may control the propulsion portion 600 to generate propulsion force using the fuel or reactant accommodated in the fuel storage portion 500.

The driver 400 may be driven using electricity that is generated or stored in the power supply portion 100 or the fuel cell portion 200. For example, the driver 400 may be driven using electricity generated from a solar cell during the daytime and may be driven using electricity generated from the fuel cell portion 200 at nighttime. In this case, in an aircraft employing a regenerative fuel cell (RFC) system, the driver 400 may be, for example, a propeller.

The fuel storage portion 500 may accommodate fuel or store a reactant generated from the fuel cell portion 200.

Referring to FIG. 1 according to an exemplary embodiment of the present invention, the fuel storage portion 500 may accommodate fuel therein. The fuel may be accommodated with mixture of water and hydrogen peroxide. In the case of an aircraft employing an RFC system, the fuel may be used when the largest amount of energy is required during take-off. That is, an aircraft employing an RFC system using a monopropellant system for a regenerative fuel cell according to the present invention may enable catalytic reaction of fuel accommodated in the fuel storage portion 500 to generate propulsion force from the propulsion portion 600 during take-off. The reactant may include any one selected from the group consisting of a hydrogen peroxide aqueous solution obtained by mixing water and hydrogen peroxide, water, or hydrogen peroxide.

Referring to FIG. 2 according to another exemplary embodiment of the present invention, the fuel storage portion 500 may be connected to a hydrogen peroxide tank 510 that accommodates hydrogen peroxide. In this case, the fuel storage portion 500 may accommodate only water and hydrogen peroxide may be introduced to the fuel storage portion 500 from the hydrogen peroxide tank 510 and may be mixed with water. The mixed water and hydrogen peroxide may generate propulsion force via catalytic reaction in a catalyst portion 700.

The propulsion portion 600 may generate propulsion force using fuel obtained via catalytic reaction in the catalyst portion 700. That is, in an aircraft employing an RFC system, the propulsion portion 600 may be a propellant such as a rocket engine.

The propulsion portion 600 may generate the largest amount of propulsion force during take-off of an aircraft employing an RFC system. Then, much propulsion force is not required during the flight and, thus, electricity may be generated by a solar cell or a fuel cell to drive the driver 400 (propeller) to enable flight.

The catalyst portion 700 may enable catalytic reaction of fuel of the fuel storage portion 500. That is, propulsion force may be generated from the propulsion portion 600 via catalytic reaction of fuel of the fuel storage portion 500.

Hereinafter, a mono-propulsion method using the aforementioned monopropellant system for a regenerative fuel cell is described.

Figure 3:
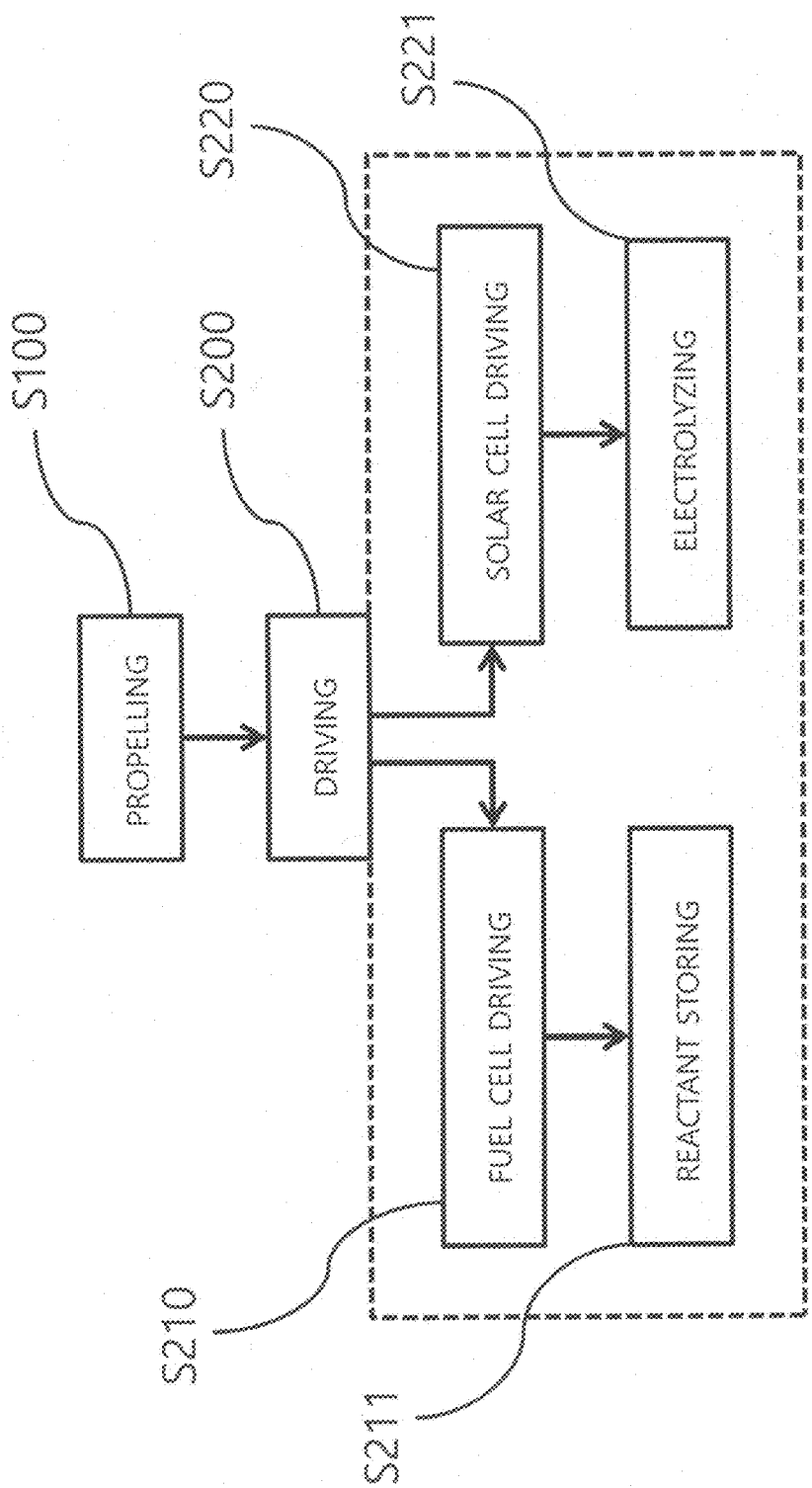
FIG. 3 is a flowchart of a mono-propulsion method for a regenerative fuel cell according to the present invention.

FIG. 3 is a flowchart of a mono-propulsion method using a monopropellant system for a regenerative fuel cell.

With reference to FIG. 3, a mono-propulsion method using a monopropellant system for a regenerative fuel cell according to the present invention is described below with regard to, for example, an aircraft employing an RFC system driven using a solar cell and a fuel cell.

As described above, the aircraft employing the RFC system flies using a solar cell and a fuel cell.

However, the aircraft employing the RFC system requires a large amount of propulsion force during take-off. To overcome this, according to the present invention, a monopropellant is used during take-off and a large amount of propulsion force is not required during the flight and, thus, the air craft may fly using electricity generated from the solar cell and the fuel cell.

The mono-propulsion method using the monopropellant system for the regenerative fuel cell according to the present invention may include propelling S100 and driving S200.

In the propelling S100, propulsion force may be generated using fuel accommodated in the fuel storage portion 500. That is, when an aircraft employing an RFC system takes off, the aircraft may generate a large amount of propulsion force using the fuel accommodated in the fuel storage portion 500 to take off.

In this case, the fuel may be used in a state in which water and hydrogen peroxide are mixed.

The fuel storage portion 500 may accommodate water therein and may be connected to the hydrogen peroxide tank 510. That is, hydrogen peroxide accommodated in the hydrogen peroxide tank 510 may be introduced to the fuel storage portion 500 and may be mixed with water.

The propelling S100 may enable catalytic reaction of the fuel accommodated in the fuel storage portion 500 to generate propulsion force.

Accordingly, the propelling S100 may generate propulsion force using the fuel accommodated in the fuel storage portion 500 to enable take-off the aircraft. In this case, the fuel accommodated in the fuel storage portion 500 may be entirely consumed. Then, during the flight, water generated from the fuel cell may be stored in the empty fuel storage portion 500.

In the driving S200, when the aircraft employing an RFC system, which has taken off through the propelling S100, flies using constant propulsion force, much propulsion force is not required and, thus, the aircraft may fly using the solar cell or the fuel cell.

For example, the aircraft employing an RFC system may fly using a fuel cell through the driving S200 at nighttime when sunlight is not present. In this case, the driving S200 may include fuel cell driving S210 and reactant storing S211.

In the fuel cell driving S210, when electricity is generated from the fuel cell, hydrogen and oxygen accommodated in the hydrogen tank 210 and the oxygen tank 220 may be combined to generate electricity. Then, the generated electricity may be used in the driver 400 (propeller).

In the reactant storing S211, water generated via combination between hydrogen and oxygen in the fuel cell driving S210 may be stored in the fuel storage portion 500. In this case, the water stored in the fuel storage portion 500 may be electrolyzed to be dissolved to hydrogen and oxygen when the solar cell is driven to generate electricity.

On the other hand, an aircraft employing an RFC system may fly using a solar cell through the driving S200 during the daytime when sunlight is present. In this case, the driving S200 may include solar cell driving S220 and electrolyzing S221.

In the solar cell driving S220, when electricity is generated from the solar cell, electricity may be generated by the solar cell and may be used in the driver 400 (propeller).

In the electrolyzing S221, the water generated by the fuel cell may be electrolyzed to be dissolved to hydrogen and oxygen using a portion of the electricity generated by the solar cell. In this case, the dissolved hydrogen and oxygen may be stored in the hydrogen tank 210 and the oxygen tank 220, respectively and, when a fuel cell is used, hydrogen and oxygen may be used.

A monopropellant system for a regenerative fuel cell according to the present invention may be applied to vehicles, vessels, other mobile devices, power supplies, and so on as well as an aircraft employing an RFC system.

The present invention is not limited to the abovementioned exemplary embodiments, and may be variously applied, and may be variously modified without departing from the gist of the present invention claimed in the claims.

The invention claimed is:

1. A monopropellant flying system comprising:
   (1) a power supply configured to supply electricity:
   (2) a fuel cell configured to use hydrogen and oxygen to generate electricity and water as byproduct;
   (3) a propeller configured to use electricity from the power supply and/or the fuel cell;

(4) a storage configured to store a monopropellant and further configured to receive the water from the fuel cell such that, upon receiving water from the fuel cell, the monopropellant is mixed with the water in the storage; and
(5) a propulsion device configured to use the monopropellant or a mixture of the monopropellant and water from the storage to generate propulsion force at the time of take-off.

2. The system of claim 1, wherein the propulsion device further comprises a catalyst configured to enable catalytic reaction of the monopropellant or the mixture from the storage.

3. The system of claim 1, further comprising a monopropellant tank configured to contain the monopropellant and connected to the storage for supplying monopropellant to the storage, wherein the monopropellant comprises a hydrogen peroxide.

4. The system of claim 2, further comprising a controller configured to control to electrolysis of the water from the storage using electricity from the power supply to generate hydrogen and oxygen, wherein the system further comprises a hydrogen tank for storing the hydrogen from the electrolysis and a oxygen tank for storing the oxygen from the electrosis.

* * * * *